Nov. 28, 1939.  F. W. HACK  2,181,128
UNIVERSAL MACHINE TOOL
Filed June 30, 1937  6 Sheets-Sheet 1
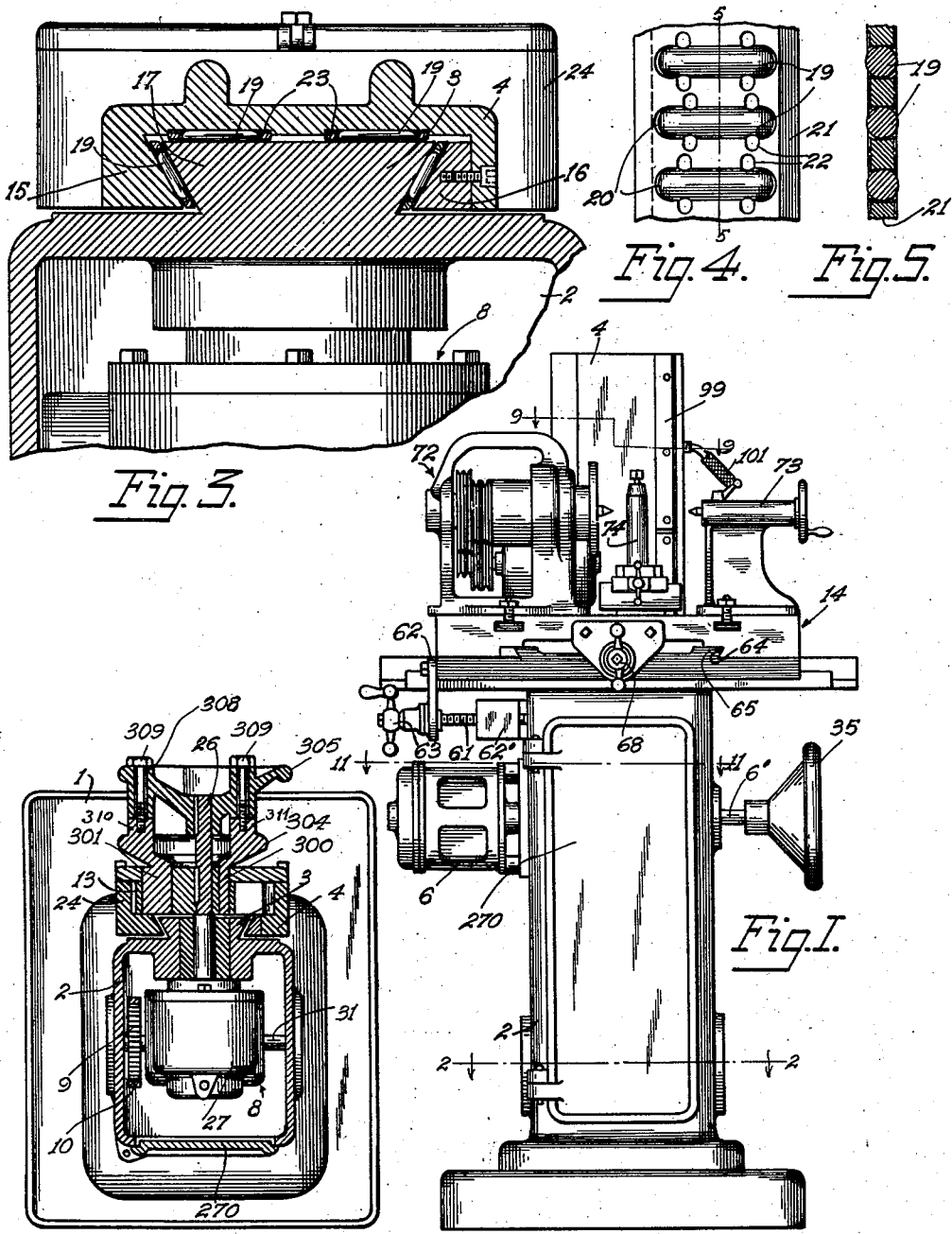
Inventor:
FRANK W. HACK.

Nov. 28, 1939.  F. W. HACK  2,181,128
UNIVERSAL MACHINE TOOL
Filed June 30, 1937  6 Sheets-Sheet 2
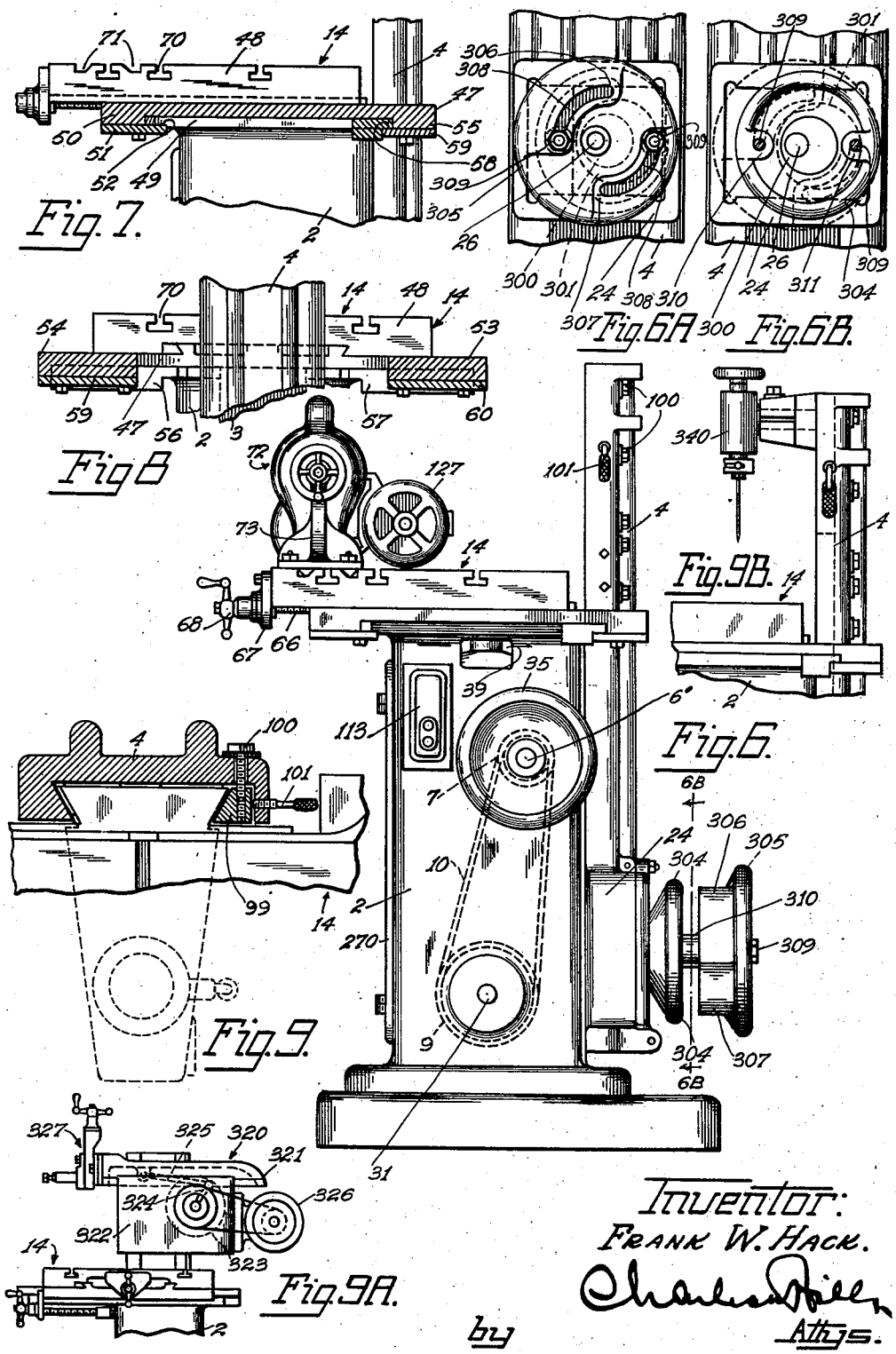
Inventor:
FRANK W. HACK.

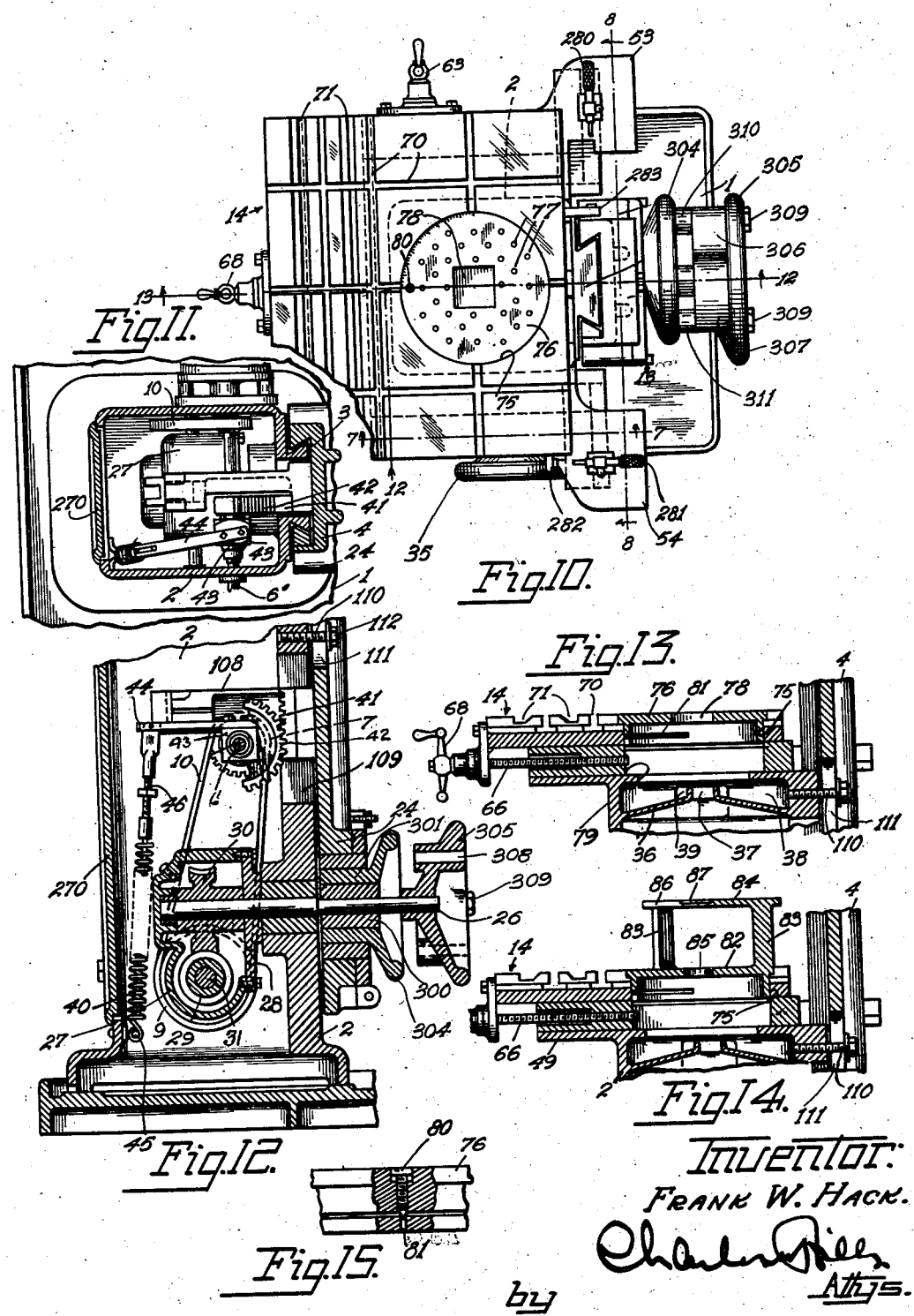

Nov. 28, 1939.   F. W. HACK   2,181,128
UNIVERSAL MACHINE TOOL
Filed June 30, 1937   6 Sheets-Sheet 4

Inventor:
FRANK W. HACK.
by Charles Hill
Attys.

Nov. 28, 1939.　　　　F. W. HACK　　　　2,181,128
UNIVERSAL MACHINE TOOL
Filed June 30, 1937　　　6 Sheets-Sheet 5
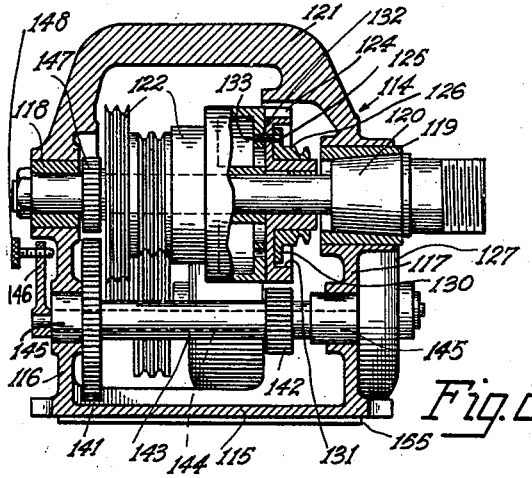
Fig. 21.
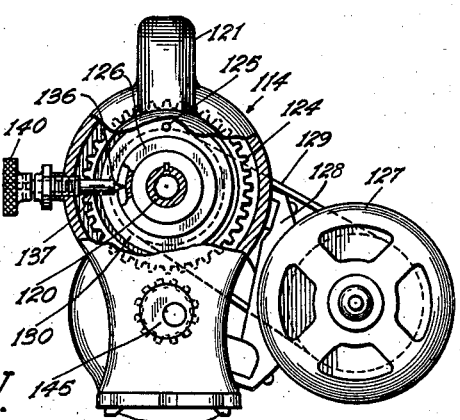
Fig. 22.
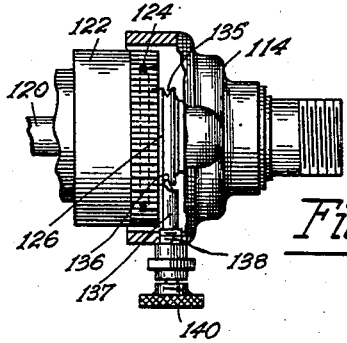
Fig. 23.
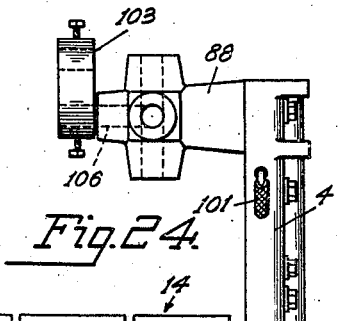
Fig. 24.
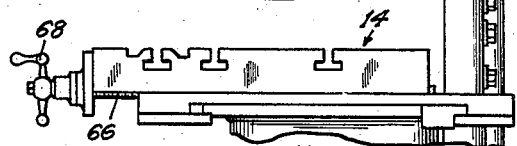
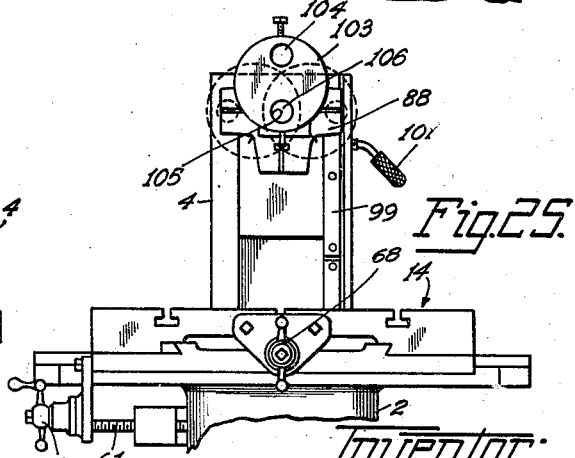
Fig. 26.
Fig. 25.
Inventor:
Frank W. Hack.
by Charles Hill
Attys.

Nov. 28, 1939.   F. W. HACK   2,181,128
UNIVERSAL MACHINE TOOL
Filed June 30, 1937   6 Sheets-Sheet 6
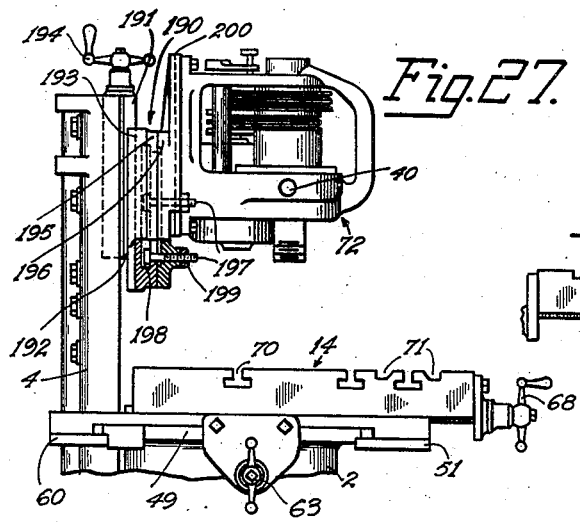
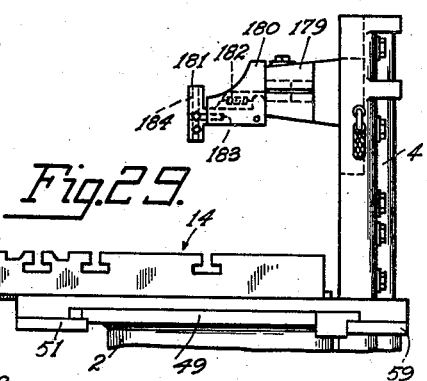
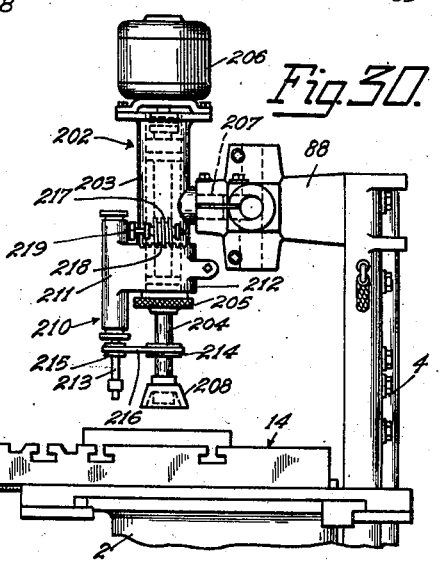
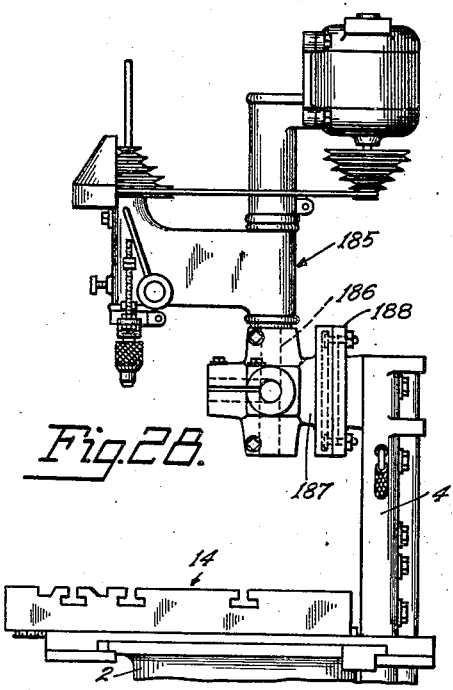
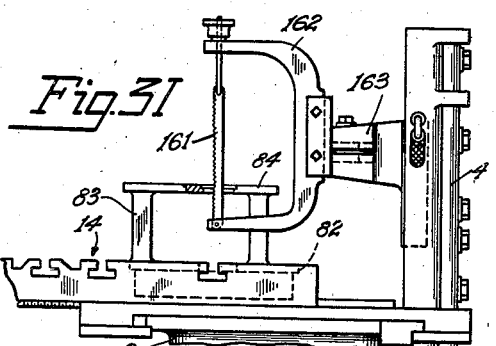
Inventor:
FRANK W. HACK.

Patented Nov. 28, 1939

2,181,128

UNITED STATES PATENT OFFICE 2,181,128

UNIVERSAL MACHINE TOOL

Frank W. Hack, Wauconda, Ill.

Application June 30, 1937, Serial No. 151,153

21 Claims. (Cl. 29—27)

My invention has for its object the provision of an improved machine for use in making dies and molds, tools and various other metallic articles and is capable of more general use in manipulating various different kinds of metal cutting tools or associating various type of individual motor driven attachments therewith to do such work as is now being accomplished by filing and sawing machines, shapers, milling machines, grinders, bench lathes, and various other types of machine tools.

The improved machine involves various novel features in its construction and the mode of operation and adjustments, which especially adapts it for economically doing high grade metallic die work and for doing various different types of machine work as well as for other uses as will be readily apparent by those skilled in the art.

The manufacture of punches and dies and tools of similar nature requires the use of various types of machine set-ups to perform the various different machine operations which necessitates the transferring of the work from one type of machine to another to perform these various machine operations to bring the die to completion. These various machine setups include machines such as shapers, milling machines, grinding machines, and the like and the time consumed transferring the work from one machine to the other and the setting up of each machine to perform its particular machine operation represents a large percentage of the total time required to complete a die or tool which greatly increases the cost of the same and frequently results in inaccuracies.

The machine is applicable to heavy duty service for performing such machining operations that require considerable power, or for lighter work in which various individual motor driven attachments may be associated with the machine to perform the various different machining operations to completely finish the die. These attachments are easily and quickly changed to permit operations such as shaping, milling, grinding, and various other machine operations to be performed on the machine and become in a sense an integral part of the machine. Thus the time lost by the usual method in transferring the work from one type of machine to another and the setting up of different machines to perform various operations is eliminated. The diemaker by the use of the machine in combination with the various tool operating attachments may perform the various different operations to complete a die without the use of other machines, thus eliminating the time lost in changing machine setups. The ease and simplicity of changing from one tool operating attachment to another makes the time consumed in making such changes negligible.

A feature of the machine of my invention is the provision of a vertically disposed power ram which is supported by the pedestal of the machine and associating actuating means therewith to communicate reciprocating movement to the ram and including adjustable means associated with said actuating means for regulating or adjusting the length of stroke of the ram between maximum and minimum limits.

Another feature of the machine is the utilization of the vertical reciprocating movement of the ram to perform machining operations such as filing, hack sawing, broaching and slotting and the like.

Another feature of the machine is the provision of a support detachably secured to the reciprocating ram having a plurality of radially disposed socket openings providing means to permit the proper positioning and securing of various types of tool holders or individual motor driven attachments thereto.

Another feature of the machine is the provision of a work table supported upon the pedestal of the machine for supporting work to be machined and feeds associated therewith capable of imparting longitudinal as well as lateral movement in combination with the reciprocating ram for positioning material relative to the tool secured to the support on the ram to accomplish the necessary machining that is to be performed on the material.

Another feature is the provision of means associated with the ram for locking the same against movement and to rigidly fix the ram to any desired height to permit the positioning of various individual motor driven attachments such as a drill press, grinding head, high speed filing device or the like relative to material supported on the work table of the machine.

Another feature is the provision of manual adjusting means associated with the ram for adjusting the same vertically to position the tool or attachment secured to the support on the ram relative to the material secured on the work table.

Another feature is the provision of a self locking worm and worm gear unit associated with the power transmission which serves additionally as means for maintaining the ram in any position to which it may be adjusted by the manual adjusting means associated with the ram.

Another feature is the manual adjustment of the ram in combination with the longitudinal and cross feeds of the work table to move the material secured to the same relative to the tool or attachment positioned on the ram to perform the necessary machining on the material supported on the work table.

Another feature is the provision of a removable work plate in the work table to which material to be machined may be secured which is capable of radial adjustment relative to the tool supported on the ram and locking means therefor to maintain the same in any of its adjusted positions.

Another feature is the provision of T slots in the work table in combination with the work plate positioned in the same which provides means for securing material to be machined either in fixed position on the work table or to the work plate whereby the material to be machined in addition to movement longitudinally or laterally under the control of the feeds of the work table can be adjusted radially.

Another feature is the provision of a portable integral motor driven head stock which when associated with a suitable tailstock and compound slide rest secured to the work table and maintained in alignment thereon by aligning means in the work table, permits turning or other operations that can be performed on a lathe.

Another feature is the use of the portable motor driven lathe head stock as a milling head by associating the same with a combination compound rest and swivel support secured to the ram of the machine which permits the head to be adjusted vertically, horizontally, or in an angular position and in combination with the longitudinal and cross feeds of the work table, the material to be billed is moved to accomplish the necessary operations.

Another feature is the provision of a portable motor driven shaper head horizontally supported on the ram and capable of horizontal reciprocating movement and in combination with the longitudinal and cross feeds of the work table will perform the necessary machining of the material supported on the work table.

Another feature is the provision of an eccentric holder in combination with a support secured to the upper end of the ram, provided with means for securing thereto various tool holding devices or various motor driven attachments to increase the working range of the tool or attachments either vertically or horizontally about a given center.

The features above outlined as well as others not specifically pointed out will be readily apparent by those pointed out in the art from a consideration of the following description taken in conjunction with the drawings in which like reference characters in the various views denote like parts and wherein:

Fig. 1 is a front elevation of the machine of my invention showing a portable lathe head stock, tailstock, and compound slide mounted on the work table.

Fig. 2 is a sectional view taken on the line 2—2 of Fig. 1.

Fig. 3 is a partial view in horizontal section of the ram and pedestal to clearly illustrate the anti-friction roller bearings associated with the ram.

Fig. 4 is a view of a section of the anti-friction roll bearing associated with the ram.

Fig. 5 is a sectional view taken on the line 5—5 of Fig. 4.

Fig. 6 is a right side elevation of the machine showing a lathe headstock, tailstock, and compound tool rest attached to the work table of the same.

Fig. 6A is a partial view in elevation of the adjusting means associated with the ram for regulating the reciprocating stroke of the same.

Fig. 6B is a sectional view along the line 6B—6B of Fig. 6 looking in the direction of the arrows indicated thereon.

Fig. 7 is a sectional view of the compound work table taken on the line 7—7 of Fig. 10.

Fig. 8 is a sectional view of the compound work table taken on the line 8—8 of Fig. 10.

Fig. 9 is a sectional view along the line 9—9 of Fig. 1 illustrating the clamping means provided in the upper end of the ram for securing a support to the upper end thereof.

Fig. 9A illustrates a shaper attachment associated with the machine.

Fig. 9B illustrates a collet attachment associated with the machine.

Fig. 10 is a plan view of the machine with the headstock, tailstock, and center rest shown in Fig. 6 omitted.

Fig. 11 is a sectional view along the line 11—11 of Fig. 1.

Fig. 12 is a sectional view taken on the line 12—12 of Fig. 10 illustrating the driving connection between the power transmission and the ram.

Fig. 13 is a sectional view taken along the line 13—13 of Fig. 10 showing the circular work plate in position in the compound work table.

Fig. 14 is a sectional view similar to Fig. 13 but showing a circular plate provided with an elevated work plate.

Fig. 15 is a fragmentary vertical section of the circular work plate showing the locking means provided for the plate.

Fig. 16 is a rear elevation of the machine.

Fig. 17 is a partial view of the work table and ram of the machine in elevation illustrating a preferred form of support detachably secured to the upper end of the ram for securing thereto various cutting units or individual motor driven attachments.

Fig. 18 is a top view of Fig. 17.

Fig. 19 is a side elevation of the upper portion of the machine showing an individual motor driven high speed filing attachment associated with the machine.

Fig. 19A is a left side view of Fig. 19.

Fig. 20 shows a file associated with the machine attached at its upper end to a support secured in the upper end of the reciprocating ram.

Fig. 21 is a vertical section of the portable directly connected motor driven lathe headstock which may be associated with the machine as illustrated in Fig. 1.

Fig. 22 is an end view of Fig. 21 with parts broken away to illustrate the pin clutch mechanism of the lathe head.

Fig. 23 is a fragmentary plan view of Fig. 21 with parts broken away to illustrate the means for controlling the pin clutch control member.

Fig. 24 is a right side elevation of the upper portion of the machine showing an eccentric device associated with the support to increase the range of movement of cutting units when positioned thereon.

Fig. 25 is a front view of Fig. 24.

Fig. 26 shows a broaching tool associated with the machine and attached at its upper and lower ends to the upper support and lower arm secured to the reciprocating ram.

Fig. 27 is a left side elevation of the upper portion of the machine showing the lathe headstock used as a milling head attachment.

Fig. 28 is a view of the upper portion of the machine showing a drill press unit associated with the same.

Fig. 29 shows a shaper head associated with the reciprocating ram of the machine.

Fig. 30 shows a combined grinder head and high speed grinder supported in an adapter secured to the ram of the machine.

Fig. 31 shows a hack saw frame positioned on a support secured to the reciprocating ram in combination with the elevated circular work plate.

The machine of my invention comprises in general a supporting pedestal 2 which supports the component parts that go to make up the machine of my invention. An integrally formed vertically disposed way 3 at the rear of the same and pedestal extends the height of the same and slideably supports a vertical ram 4 which extends beyond the pedestal way and which is capable of vertical reciprocating movement thereon. A power unit for affecting movement of the ram comprises a motor 6 secured to the side of the pedestal 2 in combination with a worm and worm gear unit 8 located in the base of the pedestal. Gears 7 and 9 fixed respectively on the shaft 6' of the motor and worm shaft of the unit 8 and connected by a silent chain 10 transmits power to this unit 8. The unit 8 is linked to the vertical reciprocating ram 4 by means of an eccentric unit contained in a yoke 13 positioned in a cross head arrangement on the ram to impart vertical reciprocating movement to the ram when so desired and includes adjusting means 12 incorporated in the unit to provide means for adjusting the stroke of the ram 4 within predetermined limits. A compound work table 14 is provided which is supported by the pedestal and capable of longitudinal and crosswise movement by suitable feed screw adjustments. The various units as generally outlined above will be more fully hereinafter described as will also the mode of operation of these combined units to provide an efficient machine for performing many machine operations on material such as metal, wood, or the like.

Referring now to the vertical reciprocating ram 4 which as above pointed out is slideably supported on the rear vertical way 3 is provided with dovetail guide flanges 15 and 16 which traverse the length thereof and in combination with the dovetail way 3 slideably support the ram on the rear of the pedestal to permit vertical reciprocating movement of the same through the agency of the power transmitting devices and eccentric unit 12 and yoke 13 as will presently be described. The flange 16 is in the form of an adjustable gib and cooperates with the adjacent side of the way 3 for the usual purposes.

Flat strips of rollers bearings as illustrated in Fig. 4 are provided to reduce the friction between the reciprocating ram 4 and the way 3 to a minimum and comprise roller bearings 19 which are retained in equally spaced transversely disposed slots 20 in a bearing keeper strip 21 by tongue formations 22 extending slightly above and below the bottom and top edges of the transverse slots. These tongue formations 22 are formed by means of a suitable swaging operation and retain the roller bearings against displacement and in alignment and rotatable therein. The inner face of the ram 4 is provided with spaced vertically disposed recesses 23 which receive predetermined lengths of keeper strip 21 and the contained roller bearings 19 to contact the respective faces of the way 3 and recesses in the ram 4. Similar strips of roller bearings are inserted between the respective sides of the dovetailed guide flanges of the ram 4 and the adjacent sides of the dovetail way 3.

The ram 4 at its lower extremity has integrally formed therewith a shallow cross head formation 24 slideably supporting the yoke 13 between the top and bottom ways 25 in the cross head, and the eccentric unit 12 positioned therein is associated with a shaft 26 of the unit 8. The unit comprises a housing 27 and a detachably secured cover plate 28 for the enclosing of the self locking worm 29 and worm gear 30 of the same. The longitudinally disposed shaft 26 to which the worm gear 30 is fixed is supported at its one end in a bearing positioned in the housing 27 and extends rearwardly through a bearing in the pedestal and into the cross head 24. A transverse shaft 31 is supported at its respective ends in bearings positioned in the respective sides of the pedestal 2 and passing through the housing has keyed thereto the worm 29 located within the housing 27 and the gear 9 located exterior of the same. Power is transmitted to the shaft 31 from the motor 6 through the agency of the gears 7 and 9 and silent chain 10 and the worm 29 in combination with the worm gear 30 rotation is communicated to the shaft 26 and its associated eccentric unit 12.

The eccentric unit 12 comprises an inner eccentric 300 mounted out of center on the shaft 26 and fixed thereon by a suitable key and keyway, and an outer eccentric 301 provided with an out of center opening 302 of a size to fit over the inner eccentric 300. The eccentric 301 is provided with an integrally formed inverted conical projection which terminates into an annular ring formation to form a hand wheel 304 to facilitate manual rotation of the eccentric 301 about the eccentric 300 for purposes as will presently be described. The shaft 26 extends rearwardly through the eccentric 300 and has keyed thereto a hand wheel 305 which is provided with integrally formed diametrically opposite arcuate shaped lugs 306 and 307 provided with arcuate slots 308 radially disposed therein with reference to the eccentric 300. Bolts 309 which pass through the slots 308 have threaded engagement with tapped orifices in integrally formed diametrically opposite bosses 310 and 311 to operatively associate the eccentric 300 keyed to the shaft 26 and the eccentric 301 positioned on the eccentric 300. The bolts 309 when turned down clamp the hand wheels 304 and 305 against movement relative to each other and as the hand wheel 305 is keyed to the shaft 26 the eccentrics 300 and 301 are rotated as a unit when the shaft 26 is rotated. The unit 12 comprising eccentrics 300 and 301 in combination with the sliding yoke 13 in which the unit 12 is supported communicates a vertical reciprocating movement to the ram 4 and the length of stroke of the reciprocating ram is dependent upon the position of the cam 301 relative to the cam 300.

The stroke of the ram 4 is adjustable within predetermined maximum and minimum limits and is governed by the position of the eccentric 301 with relation to the eccentric 300 keyed to the shaft 26. The eccentric 300 is keyed out of center on the shaft 26 and as the eccentric 301 is also positioned out of center on the eccentric 300 the eccentricity between centers of the respective eccentrics 300 and 301 may be altered from maximum to minimum by rotation of the eccentric 301 with respect to the cam 300. When the eccentricity between centers of the respective eccentrics 300 and 301 are at maximum and with the eccentrics 300 and 301 locked in such position by the bolts 309 as previously described, rotation of the shaft 26 will cause the eccentric unit 12 to rotate through its maximum throw and in combination with the yoke 13 in which the unit 12 is positioned therefore communicates a predetermined maximum stroke to the ram 4. To alter the stroke of the ram 4 the bolts 309 are loosened permitting the eccentric 301 to be rotated in a counter clockwise direction with reference to Fig. 6A of the drawings about the cam 300. Rotation of the shaft 26 and eccentric 300 keyed thereto during the rotation of cam 301 is prevented by reason of the self locking worm 29 and worm gear 30 of the unit 8 but to positively insure against rotation of the eccentric 300 during the adjustment of the eccentric 301 the hand wheel 305 keyed to the shaft may be held while the cam 301 is being rotated by movement of the hand wheel 304. This counter clockwise rotation of the eccentric 301 about the stationary eccentric 300 decreases the eccentricity between centers of the eccentrics 300 and 301 to thus decrease the throw of the unit 12 when the shaft 26 is rotated. Suitable graduations (not shown) may be provided on the respective lugs on the hand wheel 305 and bosses of the hand wheel 304 to permit accurate adjustment of the eccentric 301 relative the eccentric 300 for a predetermined stroke of the ram 4. When such adjustment is obtained the bolts 309 are again tightened to maintain the eccentrics in such position.

I also provide means for manually moving the vertically disposed ram 4 in the form of a hand wheel 35 fixed to the motor shaft 6' and as the wheel 35 is turned the transverse shaft 31 is rotated through the agency of the silent chain 10 which connects the gear 7 on the motor shaft 6" and the gear 9 on the transverse shaft 31 and the worm 29 and worm gear 30 in combination with the eccentric unit 12 and yoke 13 causes vertical movement of the same in an up or down direction depending upon the direction that the hand wheel is turned. The distance traveled by the ram 4 in its up or down manual adjustment is dependent upon the adjustment of the eccentric 12 as previously described. The worm 29 and worm gear 30 are of the self locking type in which the thread or helix angle of the worm and worm gear is slight so that any counter pressure which may be exerted upon the worm gear by extraneous forces will prevent turning of the operating parts associated with the ram. This feature of associating the ram with a self locking worm and worm gear unit permits the ram to remain in any adjusted position without the need of tightening the locking device associated with the ram for additional safety and which will be more fully hereinafter described.

A counterbalance positioned in the pedestal is provided to overcome the inertia of the reciprocating ram at the top of its vertical ascent and descent comprises a helical spring 40 in combination with a rack 41 secured to the ram 4 and gear segment 42 secured to a square collar 43 rotatably supported on the motor shaft 6'. The collar 43 has secured to it a forwardly extending arm 44 to which the upper end of the spring 40 is adjustably secured. The lower extremity of the spring 40 is connected to a link 45 secured within the pedestal near its base and a suitable turn buckle device 46 secured respectively to the arm 44 and spring 40 provides a means for adjusting the tension of the spring. The vertical reciprocating movement of the ram 4 transmits rocking movement to the collar 43 through the medium of the rack 41 and gear segment 42, causing the free end of the arm 44 to be moved through a predetermined arc to alternately increase and decrease the tension of the spring, producing smooth reciprocating movement of the ram and also reducing vibration to a minimum.

The compound work table 14 to which I will now refer in detail comprises a lower slide 47 and an upper slide 48 supported on a substantially square shaped plate 49 formed by a peripheral flange extending at right angles from the upper extremity of the pedestal 2. The lower slide 47 of the table which rests upon the plate 49 is rectangular in contour and has formed at its forward edge a rib formation 50 which overhangs the forward edge of the plate 49. A retaining plate 51 is secured to the bottom of the rib 50 and is of such width as to permit its rear edge to extend under the front edge of the plate 49 and into an undercut portion 52 in the bottom edge of the same, and this plate 51 in combination with the undercut portion 52 of the plate 49 forms the front way for the lower table slide 47.

The lower table slide 47 is provided with integrally formed wing members 53 and 54 which extend rearwardly and laterally therefrom and are provided with rib formations 55 at their respective rear edges which overhang respectively laterally extending arms 56 and 57 integrally formed with the pedestal plate 49. The arms 56 and 57 are provided with undercut portions 58 which receive the forward edges of retaining plates 59 and 60 secured respectively to the rib formations of the wings 53 and 54, and these plates 59 and 60 in association with the undercut portions of the laterally extending arms form the rear way for the table slide 47.

A cross feed screw 61 for imparting lateral movement to the table slide 47 is rotatably secured in an apron member 62 fastened to the side of slide 47 and extends through a block 62' secured to the pedestal 2 and has threaded engagement therewith. A handle 63 secured to the forward end of the screw 61 when turned clock or counter clockwise moves the table slide 47 laterally to the right or left along the front and rear ways and has associated therewith graduated indicating markings of the usual kind to permit accurate transverse adjustment of the table 14.

The upper slide 48 of the work table 14 is rectangular in shape and slideably positioned on the table slide 47 and adjustable longitudinally thereon. The bottom of the table slide 48 is provided with spaced ways 64 extending longitudinally thereof and cooperate with similarly spaced ways 65 on the top face of the lower table slide 47 and are of the usual construction and serve to slideably support the table slide 48 on the lower table slide 47.

A longitudinal feed screw 66 for imparting longitudinal movement to the table slide 48 independent of the slide 47 is rotatably secured in an apron member 67 secured to the front of the slide 48 and extends through an opening in the slide 47 and in threaded engagement therewith. A handle 68 secured to the forward end of the screw 66 when turned clock or counterclockwise moves the table slide 48 forward or backward independent of the slide 47 and has also associated therewith graduated indicating markings of the usual kind to permit accurate adjustments of the table slide 48.

The handle 63 associated with the table slide 47 when turned clock or counter-clockwise moves the table 14 as a whole to the right or left through the agency of the cross feed screw 61 and the handle 68 associated with the table slide 48 when turned clock or counter-clockwise moves the table slide 48 forward or backward through the agency of the longitudinal feed screw 66 along the lower slide 47 independent of the adjustment of the table slide 48. Thus the lower and upper slides 47 and 48 together form the compound work table 14 for purposes as will presently be described.

The upper slide 48 of the table 14 is provided with spaced T slots 70 positioned longitudinally and transversely therein and provides means in combination with suitable bolts or clamping members for securing to the table material to be machined by tools or attachments supported by the ram 4. Spaced angular ways 71 extending across the table are also provided to align lathe attachments such as a headstock 72 and tailstock 73 on the table and suitably secured thereon by means of bolts in combination with the T slots 70 to form a lathe for performing turning operations. A compound slide and tool support 74 associated with the head and tailstocks is also secured to the table.

The upper slide 48 of the compound table 14 as clearly illustrated in Fig. 13 is provided with a circular counterbored opening 75 adapted to receive a circular flat work plate 76 flush with the top of the work table 14 and having a plurality of geometrically arranged tapped orifices 77 serving as means for securing material to be machined. A central opening or tool passage 78 in the plate permits clearance for cutting tools above and below the work surface. The lower slide 47 of the table 14 is also provided with a tool passage 79. The plate 75 is capable of adjustment radially and locking means in the form of a tapered screw pin 80 in combination with a slotted or split portion 81 in the depending collar of the plate secures the same in adjusted position against rotation. The plate may have peripheral graduations which will facilitate positioning the work on the same to any desired angle within a horizontal plane.

Another plate 82 used interchangeably with the one previously mentioned and hereinafter referred to as the elevated work table and plate, fits into the counterbored aperture 75 of the upper table slide 48 and is provided with a similar locking device and graduations as provided on the plate 76. This plate 82 differs from the other in that it has a multiplicity of posts 83 projecting several inches above the normal top of the table and supports in a suspended manner a rectangular elevated table 84, the said posts being so divided as to provide clearance for such tool holding devices as may be used to support cutting tools from either below, above, or jointly in relation to the elevated plate. This plate 82 has through its center an opening 85 to permit passage of cutting tools and has in the post supported table 84 a slot 86 from one edge through the thickness of the plate to the center opening 85 permitting passage of cutting tools from the outer extremity to the center of the table. This post supported table is also provided with threaded holes geometrically arranged for clamping purposes.

The adapter 88 for supporting various cutting units or various motor driven attachments illustrated in Figs. 17 and 18 of the drawings comprises a dovetailed slide member 89 and extending forward therefrom is an arm foundation 90. The forward end of the arm has formed therein diametrically opposite vertically disposed sockets 91 and 92, two diametrically opposite horizontally disposed sockets 93 and 94, and a forwardly extending horizontally disposed socket 95. The socket openings 96 in these five socket projections provide means for securing various types of fixtures, tool holders, or individual motor driven attachments to the right or left horizontally, above or below vertically, or forward horizontally of the support 88. The sockets are split at 97 as shown, and a clamping bolt 98 associated with each of the sockets when tightened secures the fixture or tool holder or attachment therein. The sockets in the adapter are also adapted to support various individual motor driven attachments which become integral parts of this machine for performing various types of machine work as will be more fully hereinafter described. The adapter 88 as illustrated may be considered a preferred form of adapter, but it is to be understood however that other types of adapters may be used such as the type illustrated in Figs. 29 and 31 of the drawings. This type of adapter is provided with a single socket opening for the reception of certain of the cutting units.

The ram as previously pointed out is provided with a dovetailed slide which extends the length thereof and has associated therewith the usual strip or jib 16 which is constructed of two sections, an upper short portion or section 99 loosely secured in position by bolts 100 which pass through clearance holes in the ram and have threaded engagement with tapped openings in way strip section. The loosely secured section of way strip permits the securing of an adapter as 88 in the upper end of the ram to which may be fastened various fixtures for supporting tools or motor driven attachments for machining material secured to the compound table 14. A locking stud 101 having threaded engagement with an orifice in the side of the ram 4 when turned by means of a handle integral therewith forces the loosely secured section of strip 16 into engagement with the adjacent face of the adapter 88 to clamp the same in position in the upper end of the ram.

An eccentric holder 103 in the form of a circular disk or plate and including a pair of diametrically opposite openings 104 and 105 provides means when associated with the adapter 88 secured in the upper end of the ram 4 to afford a wide range through which the fixture or attachment may be adjusted to the right or left. A shank 106 secured in the opening 105 by a suitable set screw provides means for attaching the eccentric holder 103 to the adapter 88 either horizontally or vertically. The opening 104 provides means to permit securing of various types of tool holders or any of the various attachments already referred to the eccentric holder 103. The holder may be moved to the right or left with the shank 106 acting as a pivotal point to increase the range through which the attachment or other means secured therein may be moved to machine material secured to the table.

A partition in the upper end of the pedestal 2 formed by downwardly sloping partition walls 36 is provided with a central orifice 37 to provide a tool passage for files, saws, broaches, or the like that are suspended from the tool support secured to the ram and extend through the tool passages 78 and 79. This partition wall forms a receptacle 38 into which metal filings, chips or the like which drop through the tool passage in the work table and from the reciprocating cutting tool are deposited. Suitable openings 39 in the respective sides of the pedestal 2 provide access to the receptacles 38 to permit the removal of accumulated metal waste deposits.

When performing heavy duty filing, broaching, or sewing, the reciprocating movement of the ram is utilized to impart long stroke movement to the tools for the rapid removal of metal from the part being machined. Such tools may be suspended from the fixtures secured to the adapter 88 with lower free end of the same extending through the tool passages 37, 78, and 79, or it may be secured to suitable holding means fitted in an arm 108 attached to the reciprocating ram 4 for added rigidity. This arm 108 is secured to the ram by suitable bolts and extends forward into the pedestal 2 through a rectangular opening 109 in the rear way 3 on the pedestal. The forward end of the arm is provided with a socket opening for receiving suitable fixtures to which the lower ends of the tools such as files, broaches, or saws may be secured. The front of the pedestal is equipped with a hinged door 270 which permits access to the interior of the pedestal and the arm 108. The terior of the pedestal 2 may be equipped with suitable compartments for the reception of cutting tools such as files, broaches, and the like.

A threaded stud 110 fixed in the rear way 3 of the pedestal 2 extends through an elongated slot 111 in ram 4 and a nut 112 having threaded engagement with the stud when turned down locks the ram 4 against movement. This locking feature is utilized when the ram is used as a fixed support or for holding the ram at any desired elevation. Attachments of the type previously described may be secured in position on the adapter 88 and adjusted up or down vertically by means of the hand wheel 35 to position such attachment relative to the material to be machined. After such adjustment is obtained the ram will remain in such position by virtue of the self-locking feature of the worm 29 and worm gear 30 associated with the power transmission and the locking means just described serves as additional means for positively locking the ram against movement. I also provide an overload relay which is contained within the starter and stopping control box 113 secured to the side of the pedestal to prevent damage to the driving motor should the same be started while the ram is locked against reciprocating movement.

The motor driven back geared lathe headstock shown positioned on the work table of the machine in Figs. 1 and 6 of the drawings comprises a frame 114 including a base plate 115 and upwardly extending spaced cup shaped formations 116 and 117 serving as guards for the gears associated therewith and diametrically opposite openings therein receive bearings 118 and 119 to support the spindle 120 of the head stock. A yoke member 121 spanning the spaced cup formations in combination with the base form a frame structure for supporting the component parts of the head stock and this yoke additionally serves as a handle to facilitate handling the portable headstock.

A clutch unit 122 supported on the spindle 120 and capable of rotation independent of the same and a bull gear 124 secured to the spindle by a suitable key in combination with a clutch pin member 125 secured to a collar 126 slidably supported on the hub extension of the bull gear 124 provides means for engaging and disengaging the bull wheel 124 from the clutch unit 122.

The collar slidably supported on the hub extension of the bull gear 124 is provided with an annular flange 130 which normally rests within an annular recess 131 in the face of the bull gear and permits the pin 125 secured to the collar flange 130 to extend through an orifice 132 in the face of the bull gear and into an opening 133 in the annular flange of the clutch unit 122. With the clutch pin 125 in the position as just described, power to the clutch unit 122 when applied by a motor 127 secured to the headstock frame 114 rotates to the bull gear 124 through the clutch pin connection to rotate the spindle 120.

The slidable collar 126 is provided with an annular groove 135 which in combination with an eccentric means rotatably supported in the frame provides means to slide the collar along the hub of the bull gear to bring about engagement or disengagement of the clutch pin 125 from clutch unit 122. The eccentric means is in the form of a cone shaped formation 136 eccentrically disposed on the end of a pin 137 rotatably secured in a sleeve 138 and has secured at its outer end a knob 140 to facilitate the rotation of the pin in its supporting sleeve 138. The cone shaped formation 136 on the inner extremity of the pin 137 projects into the groove 135 of the collar 126 and it is readily apparent that rotation of the pin in the direction of the arrow indicated in Fig. 23 of the drawings will cause the collar to be moved to the right withdrawing the pin 125 secured thereto from the opening 133 in the clutch unit 122 to disassociate the bull gear 124 from the same. The disengagement of the bull gear from the clutch unit will now permit the back gears of the headstock to be used for slow rotation of the spindle for heavy duty cutting.

The back gear unit of the headstock comprises gears 141 and 142 which are connected by a sleeve 143 and is rotatably supported on a shaft 144 supported in diametrically opposite eccentric bushings 145 keyed to the shaft and rotatable in bearings in the headstock frame. External means in the form of a lever 146 fixed to the shaft 144 when actuated rotates the shaft 144 to move the back gears supported thereon into respective engagement with the gear 147 secured to the clutch unit and the bull gear 124 fixed to the spindle 120. Power application applied to the clutch unit with the back gears in position as above described will cause slow rotation of the spindle 120. The lever 146 controlling the movement of the back gears is provided with a locking screw 148 which when turned down engages the frame to lock the back gears in either their operative or inoperative positions. When the back gears are again disassociated from the gears 147 and 124 under the control of the lever 146 the pin 137 may again be rotated causing its eccentrically disposed formation 136 to again move the collar 126 to the left along the gear hub and the alignment of the respective openings 132 and 133 in the bull gear and the clutch unit permits the clutch pin 125 to again enter these openings and again associate the bull gear 124 with the clutch unit 122. The engagement and disengagement of the clutch or draw pin being controlled by the pin supported on the frame and from the outside of the same provides for compactness and strength and ease of operation.

The bottom of the base of the headstock frame has formed thereon spaced V shaped ways 155 as is also the tailstock of the lathe attachment, and these V shaped ways rest in the angular ways 71 in the table 14 when they are positioned thereon and provide means for aligning purposes. The bases of the head and tailstocks are provided with slots for the reception of clamping bolts positioned in the T slots 70 of the table to clamp the head and tail stocks in aligned position.

Having described the component basic parts of the machine which are supported directly or indirectly from the pedestal in detail, I will now give a brief description of the numerous applications to which the machine of my invention is applicable for machining various materials.

The ram 4 as before described may be used as a fixed member for supporting directly connected driven attachments for performing various machining operations on material supported on the compound work table and its adjustable reciprocating movement made use of to perform various machining operations such as filing, sawing, broaching, and the like on material also supported on the compound work table.

For the rapid removal of material over broad surfaces of parts such as blocks of dies and the like a heavy duty file may be used which may be supported only at its upper end by a file holder fixture 156 secured in the adapter 88 or to the adapter 154 provided with a single socket opening as illustrated in Fig. 20 of the drawings and clamped to the upper end of the ram 4. The file will extend through the tool passages 37, 78, and 79 and may be also secured at its lower end to a file holder fixture attached to the lower arm 108 fixed to the ram 4. The material to be filed is clamped to the work table 14 by the use of bolts in combination with the T slots 70 therein or other suitable holding means and the application of power to the ram 4 through the agency of the power transmission setup as before described causes the eccentric unit 12 in combination with the yoke 13 positioned in the cross head of the ram to communicate reciprocating movement to the same. By the use of the longitudinal and cross feeds of the work table, the material supported thereon is moved to permit the file to perform the necessary filing on the material to be machined.

The machine is also applicable to the filing of deep cavities when filing to a flat bottom of certain types of die construction and for this type of work, a suitable file is secured at its upper end to a file holder such as 156 attached to an adapter in the upper end of the ram 4. The material to be filed is secured to the work table and adjustment of the material relative to the file is accomplished by the longitudinal and cross feeds of the same. By the use of the hand wheel 35 manual adjustment of the ram is accomplished to position the file with relation to the material secured to the work table and in combination with the stroke adjustment of the ram the extent of movement of the file into the cavity is controlled with precision.

The broaching of openings in gears, pulley hubs, and the like is accomplished by the use of suitable broaching tools such as 168 supported at its upper end only by a broach holder secured to an adapter 165 positioned on the upper end of the ram as clearly illustrated in Fig. 26 of the drawings. The broach extends down through the tool passages 78 and 79 in the compound work table and tool passage 37 in the partition walls 36 and may also be secured at its lower end to a broach holder secured in the arm 108 fixed to the ram 4. The article to be broached such as a gear is secured to the table by clamps or other suitable means in combination with the T slots in the work table, and the reciprocating movement of the ram causes the broaching operation to be accomplished and the longitudinal and cross feeds of the work table are used to move the article such as a gear which is being broached relative to the broaching tool.

The rapid cutting of material to approximate shape or size is accomplished by the use of a suitable hack saw blade which is substituted for the broach illustrated in Fig. 26 of the drawings and is supported at its upper end only by a saw holder or fixture secured to an adapter as 88 positioned on the upper end of the ram 4. The blade extends through the tool passages 78 and 79 in the work table 14 and tool passage 37 and may also be secured at its lower end to a saw holder or fixture secured to the arm 108 fixed on the ram. With the hack saw blade thus suspended contours of openings can be followed for roughing out purposes and the movement of the saw by virtue of the reciprocating movement of the ram 4 in combination with the longitudinal and cross feeds of the compound work table will move the material thereon relative to the saw.

The machine is also applicable to stamping of light metal parts by the use of the usual punch and die. The upper section or punch of the die is secured to the adapter 88 attached to the upper end of the ram and the lower section or die of the same is in turn secured to the compound table by suitable clamping or fastening means in combination with the T slots in the table 14. By the use of the longitudinal and cross feeds of the table 14 accurate centering of the die relative to the punch can be accomplished. The manual reciprocation of the ram 4 is controlled by the hand wheel 35 and thus the extent of movement of the punch or the amount that the same enters the die is accurately gauged. The ram may also be used to advantage in the assembly of punches and dies and the manual reciprocating movement of the ram 4 under the control of the hand wheel 35 in combination with the longitudinal and cross feeds of the table 14 permits accurate centering of each component part of the die to its associated working part and the raising and lowering of the ram 4 permits precise movement of the punch to gauge the extent of entrance of the punch into the die.

Plain hack sawing or sawing to a pattern or following the outline scribed upon an article such as a die block or the like is accomplished by the use of a hack saw blade 161 secured to a suitable U shaped frame 162 which in turn is attached to an adapter such as 163 in the upper end of the ram 4 as illustrated in Fig. 31 of the drawings. Reciprocating movement of the ram when power is applied thereto in combination with the longitudinal and cross feeds of the compound work table 14 will permit the material secured to the elevated work table 84 of the circular plate 82 to be moved relative to the reciprocating saw and in combination with the radial adjustment of the plate 82 allow the same to follow the pattern or outline scribed on the material. It is possible by the use of one or a plurality of blades held in a hack saw frame to obtain any desired width of slot or opening in the material being machined and the use of the longitudinal and cross feeds of the table 14 in combination with the reciprocating saw and radial adjustment of the plate 82 will permit the saw to follow a pattern to saw any desired width of slot or opening depending upon the number of saws clamped in the hack saw frame.

Sawing to a pattern or following the outline scribed upon material to be machined may also be accomplished by the use of a high speed combination filing, sawing, or broaching attachment of the type illustrated in Fig. 19 of the drawings. The attachment comprises a supporting frame 170 including integrally formed upper and lower bearing members for the reception of a vertically disposed reciprocating shaft 171. A horizontally disposed shaft is rotatably supported in the frame 170 and a disc 172 secured to the same has fixed thereto an eccentrically disposed pin 173 which projects into a crosshead 174 secured to the vertically disposed shaft 171. The horizontal shaft when rotated by a motor 176 supported by the frame effects rotation of the disc 172 secured thereto causing the eccentrically disposed pin 173 fixed to the same in combination with the crosshead secured to the shaft 171 to communicate vertical reciprocating movement to the same. A suitable tool holder secured to the lower end of the shaft is adapted to receive and clamp therein small files, small hack saw blades, or light broaches.

The frame is equipped with a laterally extending shank 177 which extends into a socket opening in a leg 178' of an L shaped fixture 178. The socket opening 178' is split and a clamping bolt associated therewith when turned down clamps the filing device to the L shaped fixture 178. The other leg 179 of the fixture is provided with a laterally extending shank 179' which provides means for securing this attachment to an adapter as 88 clamped in the upper end of the ram 4. By the use of the hand wheel 35 the ram 4 is adjusted to position the tool secured in the holder relative to the material secured to the table and remains in such adjusted position by virtue of the self locking worm and worm gear of the power transmission or is locked in such adjusted position by the ram lock. The use of the horizontal and cross feeds of the compound table will move the material to be machined in the desired directions relative to the reciprocating tool to follow the pattern scribed thereon. As illustrated in the drawings the filing attachment is positioned vertically above the work table and by the rotation of the L shaped fixture secured in the adapter 88 to the right or left the filing attachment to which the same is secured may be adjusted radially in a vertical plane to various angles. The frame 170 as before described is clamped in position on the L shaped fixture 178 and the loosening of the bolt associated with the split leg 178' of the fixture permits the frame 170 to be independently adjusted radially in a vertical plane at right angles to the radial vertical plane adjustment of the frame and L shaped fixture above described and this adjustment in combination with the adjustment of the filing attachment and its associated L shaped fixture permits cutting at any combination of angles. The eccentric holder 103 may be horizontally positioned in the adapter 88 to support the filing device horizontally and by virture of the adjustment of the device in the frame and the adjustment of the frame and L shaped support in the eccentric holder will permit horizontal radial adjustments at right angles to each other. The filing device may be suspended horizontally or vertically in the holder 103 or adapter 88 and in combination with the reciprocating movement of the shaft of the filing device permits lapping operations to be performed on material supported on the work table or work plate associated with the work table. One or more saw blades or broaches held jointly may also be used in this high speed attachment for obtaining the desired width of slots or openings in material supported as above described.

By the use of this high speed attachment the removal of the core of any shape in a die block is accomplished by the use of short broaches or hack saw blades secured in the holder of the said attachment and by the use of the hand wheel 35 adjustment of the tool in the attachment relative to the die block supported on the table is accomplished and in combination with the longitudinal and cross feeds of the work table the block secured thereon is moved to permit the desired opening to be cut in the same. This method of removing the core in the die block eliminates the usual drilling of holes therein adjacent to a predetermined pattern and the removal of the same by the use of a chisel. It also eliminates the usual serrated outlined caused by this drilling after the core is removed and also eliminates the machining of such serrated edge by the use of the suitable broaches or hack saw blades. Fast and accurate cutting is possible because of the ease of adjustment, thus speeding up work and at the same time producing precision work.

Shaping the edges of flat surfaces may also be accomplished by the use of a suitable shaper attachment 180 shown in Fig. 29 of the drawings which is secured to an adapter such as 179 in the upper end of the ram 4. The shaper attachment 180 is provided with a T shaped tool holder 181 pivotally secured thereto and normally resting in a slot therein and maintained in such position by a suitable helical spring 182. The holder is provided with a horizontally disposed opening 183 for securing a tool horizontal therein and a longitudinally disposed opening 184 for securing a tool longitudinal therein. The material is secured vertically upon the work table 14 and clamped into position thereon and reciprocating movement of the ram 4 in combination with the longitudinal and cross feeds of the table permits the shaper head to finish edges or flat surfaces on the material.

Material such as die blocks or jigs to be laid out according to predetermined dimensions and pattern may be suitably secured to the table and a suitable collet holder 340 of any suitable type is as shown in Fig. 9B secured in an adapter at the upper end of the ram and is adapted to receive various types of tools such as scribers or the like and in combination with the manual movement of the ram 4 under the control of the hand wheel 35 and the longitudinal and cross feeds of the table and suitable measuring devices associated with the work table, the initial laying on of the die block and graduating the same may be accomplished with precision.

By the use of the lathe headstock 72 previously described in combination with the usual tailstock 73 and compound center rest 74 various kinds of lathe work may be performed. The head and tailstocks are secured to the table and in proper alignment by virtue of the V and angular shaped ways 155 and 71 of the respective head and tailstocks and table 14. The center rest is pivotally secured to the table between the head and tailstocks for supporting the cutting tool all clearly illustrated in Fig. 1. The motor 127 attached to the frame makes possible a unitary structure which is very compact and in combination with the yoke 121 provides for easy handling when positioning or removing the headstock from the table.

Drilling may also be performed by the use of a portable individual motor driven radial drill press unit 185 illustrated in Fig. 28 of the drawings and is provided with a suitable shank 186 for insertion into either the horizontally or vertically disposed socket openings of the adapter 187 to permit drilling horizontally or vertically. Material to be drilled may be secured to the work plate 76 or the elevated work table and plate 82 by suitable clamping means and the vertical adjustment of the drill press by the use of the hand wheel 35 moves the ram 4 to position the drill relative to the work secured to either of said plates. The radial adjustment of either the plates 76 and 82 in combination with the longitudinal and cross feeds of the table 14 permits the material being drilled to be shifted for various drillings. The material to be drilled may also be held in fixed position on the work table 14 by suitable clamping means and the longitudinal and cross feeds of the work table will move the material thereon relative to the drill unit. The drill press unit will remain in its adjusted position with relation to the work to be drilled by virtue of the self locking worm and worm gear unit 8 associated with the ram 4 or the same may be locked in such adjusted position by means of the ram lock. The supporting member 187 as illustrated in Fig. 28 is provided with radially disposed socket openings similar to the support 88 and in addition is provided with swivel device 188 which permits angular adjustments of the drill press unit 185 when supported either vertically or horizontally in the support 187. The member 187 although shown associated with the drill press unit 185, it is to be understood that the same may be used to support the various other cutting units or motor driven attachments referred to in the specification.

Milling operations on materials such as punches and dies can also be performed by the use of the lathe headstock 72 in combination with a compound swivel slide 190 which is supported from the upper end of the ram 4 as illustrated in Fig. 27 of the drawings. The swivel includes a slide rest 191 comprising a dovetail slide for positioning the swivel as a whole in the upper end of the ram 4 and includes an additional dovetail slide 192 integral therewith to which is slidably secured the swivel to which the head stock is secured. The swivel comprises a square shaped body 193 provided with a dovetail way adapted to receive the dovetail slide 192 of the rest 191 and a feed screw 194 associated with the slide and provides means for adjusting the same along the rest. An annular ring formation 195 integral with the body 193 supports thereon a circular head 196 the size of the annular ring formation and bolts 197 are provided for securing the head in concentric relation with the ring formation and also serve to permit radial adjustment of the plate relative to the supporting body. The bolts 197 are provided with square heads which have one edge of each of said heads resting within an annular groove 198 cut in the inner face of the ring formation 195 and extend through suitable openings in the head 196 and nuts 199 in threaded engagement with the same when turned down cause that portion of the bolt head extending into the annular slot to be drawn against the upper face of the same to clamp the head 196 against rotation. The head 196 is, however, capable of radial adjustment relative to the body by loosening the nuts which permit rotation of the same by reason of the fact that the annular groove in the ring formation serves as a guide in which the bolt heads track when the head 196 is turned.

Longitudinal disposed angular shaped ways in the face of the head and in the upwardly projecting portion 200 of the same serves as aligning means for the lathe head when securing the same thereto in combination with the V shaped ways on the base of the headstock 72. Suitable bolts having threaded engagement with tapped openings in the heads secure the lathe head in position thereon. Tools such as cutters, drills, or the like are secured to the lathe spindle to machine the material which may be supported on the work plate 76 in the table 14 or the elevated work table and plate 82.

The T slots in the work table 14 can also be used to secure a vise, dividing head, or similar means for supporting the work. The hand wheel 35 is used to move the ram to approximately position the cutter in the lathe spindle relative to the work, and by means of the feed screw associated with the swivel unit, precision adjustment is accomplished and in combination with the longitudinal and cross feeds of the work table 14 the material supported on the table may be moved relative to the cutter fixed to the lathe spindle. The work plate 76 or the plate 82 which may also be utilized to support material to be machined may be adjusted radially to position the material relative to the cutter. The lathe head may be suspended from the swivel unit either horizontally, vertically, or any angular position relative to the material and feeding of the cutter or similar tool is accomplished by either the hand wheel 35 which manually controls the movement of the ram or the feed screw associated with the swivel unit.

Jig boring can also be performed by the use of the lathe head 72 in combination with the swivel unit 190 which is supported in the upper end of the ram. The lathe head 72 may be positioned, horizontally, vertically, or in any angular position relative to the material and feeding of the boring tool or similar device fixed to the lathe spindle may be accomplished by either the hand wheel 35 which controls the manual movement of the ram or the feed screw associated with the swivel unit. Positioning the material supported on the work table 14 or work plates 76 and 82 relative to the tool fixed in the lathe spindle is accomplished by the use of the hand wheel 35 for manual movement of the ram in combination with the longitudinal and cross feeds of the work table 14. Gauges 280 and 281 provided with micrometer adjustments within predetermined limits are fixed to the plate 47 of the work table 14 and cooperate with fixed posts 282 and 283 secured respectively to the plate 48 of the work table 14 and the platen 3 and in combination with various end measuring rods the various openings which are to be bored in a jig or the like supported on the work table 14 or plates 76 or 82 can be laid out with precision both longitudinally and laterally relative to each other.

Various grinding operations such as surface, cylindrical, internal, and tool and cutter grinding can also be performed with the use of my machine in combination with a grinding head illustrated in Fig. 30 of the drawings. The grinding head 202 comprises a tubular body 203 having a rotatable spindle 204 supported therein by suitable ring and thrust bearings and retained therein by a collar 205 having threaded engagement with the lower end of the housing. A motor 206 secured to the annular flange integral with the upper end of the housing is directly connected with the upper end of the spindle by a suitable coupling fixed respectively to the motor shaft and spindle to impart rotation thereto. A shank 207 extending laterally from the tubular housing serves to attach the grinding head to the support 88 in the upper end of the ram.

The material to be surface ground is secured to the work table by suitable clamping means such as a vise or the like or a magnetic chuck of the usual type. The grinding head 202 for this type of grinding is secured vertically in the support on the ram and by means of the adjustment of hand wheel 35 the ram is moved to position the grinding wheel 208 secured to the lower end of the spindle relative to the material secured to the work table. The longitudinal and cross feed adjustments of the work table in combination with the adjustment of the ram permits moving the work relative to the grinding wheel to perform surface grinding.

Cylindrical grinding operations can also be performed by the use of the lathe head 72 previously described in combination with the grinder head 202 which in this instance is horizontally secured in the support 88 on the ram. The lathe head which rotatably supports the cylindrical material to be ground is secured to the work table as previously described and adjustment of the grinding wheel relative to the material to be ground is accomplished by the hand wheel adjustment of the ram in combination with the longitudinal and cross feeds of the work table.

Internal grinding operations can also be accomplished by the use of the high speed grinding attachment 210 associated with the motor driven grinder head 202 illustrated in Fig. 30 of the drawings. The high speed grinder attachment comprises a tubular body 211 having a laterally extending split collar formation 212 adapted to fit around the tubular housing 203 of the grinder head to support the said high speed grinder thereon and permit the same to be adjusted radially about said tubular housing a predetermined degree. A spindle 213 is rotatably secured in the tubular body and pulleys 214 and 215 secured respectively to the grinder head spindle 204 and the high speed spindle 213 and connected by a belt 216 provides means for rotating the spindle 213. The lathe headstock 72 as used in connection with cylindrical grinding may also be used to support the material to be ground or angle plates or other holding devices for supporting the material can be attached to either the work plates 76 and 82. Adjustment of the grinder wheel secured to the high speed spindle 213 relative to the material is accomplished by the use of the hand wheel adjustment of the ram 4 in combination with the longitudinal and cross feeds of the work table and radial adjustment of the plates 76 and 82. Radial adjustment of the grinder secured to the high speed spindle for precision adjustment is accomplished by means of a worm 217 rotatably supported by lugs integral with the tubular housing of the grinder head 202 in combination with a gear segment 218 formed in the upper peripheral lip of the ring formation 212 of the tubular body of the high speed grinder 210. Rotation of the worm 217 is accomplished by means of a suitable knob 219 associated therewith to obtain precision adjustment of the grinder wheel relative to the supported material.

The grinder head may also be used for grinding cutters and tools and is positioned vertically or horizontally in the support on the upper end of the ram relative to the cutters or tools supported by the lathe and tail stocks secured to the work table. Here also the manual hand wheel adjustment of the ram in combination with the longitudinal and cross feeds of the work table will position the cutter or the like supported by the head and tail stocks relative to the grinding wheel.

Shaping operations may also be performed by the use of a portable individual motor driven shaper attachment 320 comprising a dovetailed slide for positioning the same in the upper end of the ram 4 and secured thereto by the clamping means of the ram 4 previously described. The horizontally disposed ram 321 of the shaper attachment which is capable of reciprocating movement is slidably mounted in a block 322 forming an integral part of the dovetailed slide. Various mechanical devices may be used to impart reciprocating movement to the shaper ram but for the purpose of illustration I have shown such a mechanical device in its simplest form as illustrated in Fig. 9A. The mechanism comprises a disc 323 rotatably supported in the block 322 which is provided with a radially disposed slot 324 and a connecting rod 325 which has its one end pivotally secured to a member adjustably positioned in the slot and its other end pivotally secured to the shaper ram 321. A motor 326 secured to the block 322 drives the disc 323. The pivoted member positioned in the slot 324 to which one end of the connecting rod is pivotally secured may be moved therein to increase or decrease the stroke of the shaper ram. The tool slide, clapper box, and tool holder indicated by the reference character 327 are of the usual construction and purpose and are positioned at the forward end of the shaper ram. Material to be machined is suitably secured to the work table 14 or supported in a vise or other suitable means secured on the same. The ram 4 is adjusted vertically by means of the handwheel 35 to position the shaper to the approximate height with relation to the work supported on the work table 14 and by the use of the longitudinal and cross feeds of the table 14 the material is moved relative to the reciprocating tool supported on the shaper ram to finish the edges or flat surfaces and the tool slide of the shaper provides adjustment to regulate the depth of the cut. The horizontal reciprocating movement of the shaper head ram 321 in combination with the vertical reciprocating movement of the ram 4 may be utilized to shape angular surfaces on material secured to the work table 14.

Having thus described the invention, what is claimed is:

1. A machine of the class described, the combination of a pedestal, a vertically disposed way on said pedestal traversing the height of the same, a reciprocating ram mounted on said way for interchangeably supporting an adapter to which various cutting units are secured, a compound work table horizontally disposed on said pedestal and a circular work plate rotatable in said table and flush with the top of the same, and provided with a central opening to permit cutting units to extend through said work table.

2. A machine of the class described, the combination of a pedestal, a vertically disposed way on said pedestal extending the height of the same, a reciprocating ram mounted on said way for interchangeably supporting adapters to which various cutting units are secured, a compound work table horizontally disposed on said pedestal, a circular work plate rotatable in said table and means thereon for securing material to be machined and means for moving said table longitudinally or transversely to position the material on said plate relative to the said cutting unit on said ram.

3. A machine of the class described, the combination of a pedestal, a horizontally disposed work table supported on the said pedestal, a circular work plate positioned in said work table and flush with the top of the same capable of radial adjustment relative to said work table and including means therein for securing thereto material to be machined.

4. A machine of the class described, the combination of a pedestal, a horizontally disposed compound work table supported on the said pedestal, means for said work table to move the same longitudinally or transversely, and a circular work plate positioned in said work table capable of radial adjustment relative to the longitudinal and transverse movement of said work table.

5. A machine of the class described, the combination of a pedestal a horizontally disposed work table supported on said pedestal, feed screws associated with said work table to move the same longitudinally or transversely, a removable circular work plate positioned in said work table capable of radial adjustment relative to the longitudinal or transverse movements of said table and means for locking said work plate in adjusted position.

6. A machine of the class described, the combination of a pedestal, a vertically disposed way on said pedestal traversing the height of the same, a reciprocating ram mounted on said way for supporting various cutting units, a compound work table horizontally disposed on said pedestal, a rotatable removable circular work plate positioned in said table provided with a central opening to permit cutting units to extend through said work table and an arm on said ram below said work table and tool securing means thereon to receive the lower end of said cutting unit.

7. A machine of the class described, the combination of a pedestal, a vertical way on said pedestal traversing the height of the same, a ram slidably mounted on said way, an adapter secured to said ram including means thereon for mounting cutting units in various angular positions, a work table horizontally disposed on said pedestal below said adapter for supporting material to be machined and means for operating said ram to thereby communicate up and down movement thereto to adjust said adapter and said cutting unit thereon relative to the material on said work table.

8. A machine of the class described, the combination of a pedestal, a vertical way on said pedestal traversing the height of the same, a ram slidably mounted on said way, an adapter secured to said ram provided with openings for mounting cutting units in various angular positions, a work table horizontally disposed on said pedestal below said adapter for supporting material to be machined, means for operating said ram to thereby communicate up and down movement to said ram to adjust said adapter and said cutting unit thereon relative to said material on said work table and feed means associated with said work table to move the same longitudinally or transversely relative to said cutting unit.

9. A machine of the class described, the combination of a pedestal, a vertically disposed way on said pedestal and traversing the height of the same, a ram slidably mounted on the said way, a self-locking worm and worm gear transmission unit positioned in said pedestal, eccentric means positioned in said ram operatively associated with said transmission unit and power means for operating said unit and associated eccentric means to communicate reciprocating movement to said ram.

10. A machine of the class described, the combination of a pedestal, a vertically disposed way on said pedestal and traversing the height of the same, a ram slidably mounted on said way, a worm and worm gear unit positioned in said pedestal and power means for actuating said gear unit, a shaft for said unit supporting said worm gear, an eccentric fixed out of center on said shaft and a second eccentric positioned out of center on said first mentioned eccentric to form an eccentric unit for association with said ram and means for adjusting said second eccentric with relation to said first mentioned eccentric to vary the eccentricity between centers of said eccentrics to regulate the stroke of the ram within predetermined limits.

11. A machine of the class described, the combination of a pedestal, a vertically disposed way on said pedestal and traversing the height of the same, a ram slidably mounted on the said way, a worm and worm gear unit positioned in said pedestal and power means for actuating said unit, a shaft for said unit supporting said worm gear, an eccentric fixed out of center on said shaft, and a second eccentric positioned out of center on said first mentioned eccentric to form an eccentric unit for association with said ram, means for adjusting said second eccentric with relation to said first mentioned eccentric to vary the eccentricity between centers of said eccentrics and means for locking the said eccentrics in such adjusted position.

12. A machine of the class described, the combination of a pedestal, a vertically disposed way on said pedestal and traversing the height of the same, a ram mounted on the said way, a worm and worm gear unit positioned in said pedestal and power means for actuating the same, a shaft for said unit supporting said worm gear, an eccentric fixed out of center on said shaft and a second eccentric positioned out of center on said first mentioned eccentric to form an eccentric unit for association with said ram, and means for adjusting said second eccentric with relation to said first mentioned eccentric to vary the eccentricity between centers within predetermined limits to increase or decrease the throw of said eccentric unit.

13. A machine of the class described, the combination of a pedestal, a vertically disposed way on said pedestal and traversing the height of the same, a ram slidably mounted on said way, a worm and worm gear unit positioned in said pedestal and power means for actuating said unit, an eccentric unit associated with said ram comprising an inner eccentric fixed out of center on a shaft of said gear unit and an outer eccentric surrounding said inner eccentric and positioned out of center thereon, means for adjusting said outer eccentric with relation to said inner eccentric to vary the eccentricity between centers of said eccentrics and means for locking the said eccentrics in such adjusted positions.

14. A machine of the class described, the combination of a pedestal, a vertically disposed way on said pedestal and traversing the height of the same, a ram slidably mounted on said way, a worm and worm gear unit positioned in said pedestal and power means for actuating said unit, an eccentric unit associated with said ram and said gear unit comprising an inner eccentric fixed out of center on a shaft of said gear unit and an outer eccentric surrounding said inner eccentric and positioned out of center thereon to communicate reciprocating movement to the said ram, means for adjusting said outer eccentric with relation to said inner eccentric to vary the eccentricity with relation to said inner eccentric to vary the eccentricity between centers of said eccentrics to adjust the throw of said eccentric unit to regulate the stroke of said reciprocating ram and means associated with said eccentric unit to lock said eccentrics in such adjusted position.

15. A device of the class described, the combination of a pedestal, a vertically disposed ram slidably mounted on a rear way of said pedestal which traverses the height of the same, an adapter secured to the upper end of said ram and a collet holder secured thereto and clamping means for securing a scribing tool therein, a horizontally disposed compound work table supported on said pedestal comprising an upper plate and a lower plate and screw feeds therefor for moving said table longitudinally and transversely, means on said table for securing thereto a die block or the like, adjustable measuring devices secured to the lower table plate and cooperating with fixed measuring posts on said upper plate and said rear way in combination with end measuring gauges to permit precision movement of said table longitudinally or transversely for laying out and graduating said block according to predetermined dimensions.

16. A device of the character described, the combination, of a pedestal, a vertically disposed ram slidably mounted on a rear way of said pedestal which traverses the height of said pedestal, an adapter secured to the upper end of said ram, a collet holder secured thereto and clamping means for securing a scribing tool therein, a horizontally disposed compound work table comprising an upper plate and a lower plate and screw feeds therefor for moving said table longitudinally and transversely, means on said table for securing thereto a die block or the like, manual means associated with said ram to communicate up or down movement to said ram to position said scriber in contactual engagement with said block, adjustable measuring devices secured to the lower table plate and cooperating with fixed measuring posts on said upper plate and said rear way in combination with end measuring gauges to permit precision movement of said table longitudinally or transversely for laying out and graduating the block by said scriber to predetermined dimensions.

17. A machine of the class described, the combination of a pedestal, a work table horizontally disposed on said pedestal, a ram slidably mounted on said pedestal for interchangeably supporting adapters to which cutting units are secured and a toll passage in said work table, a horizontally disposed partition in said pedestal positioned below said work table including a tool passage therein, said partition forming a receptacle in the upper portion of said pedestal wherein refuse from machining operations on material supported on said work table by cutting units supported on said ram is deposited and openings in adjacent sides of said pedestal provide access to the interior of said receptacle to remove accumulative refuse.

18. A machine of the class described comprising a pedestal, a vertically disposed way on said pedestal traversing the height of the same, a ram mounted for vertical reciprocation on said way and adapted to support various cutting units, a compound work table horizontally disposed on top of said pedestal, said table comprising a lower plate adjustable laterally on said pedestal, an upper plate adjustable forward and back on said lower plate, said upper plate having a circular opening, a circular work supporting plate removably seated in said opening and rotatable therein and having its top surface flush with the top surface of said upper plate, and driving means for reciprocating said ram for application of tools to work supported on said table.

19. A machine of the class described comprising a pedestal having a vertically disposed way on its rear side traversing the height of the same, a ram vertically reciprocable on said way and adapted at its upper end for supporting various cutting units, a compound working table horizontally disposed on top of said pedestal, said table comprising a lower plate slidably adjustable to the left or right on said pedestal, an upper plate slidably adjustable forward and back on said lower plate, said plate having circular passageways therethrough, a circular plate seated in the circular passageway of the upper plate and rotatably adjustable therein, the upper end of said pedestal having a passageway communicating with the passageways in said plates, a conical plate in said pedestal below said pedestal passageway, said circular plate and said conical plate having central passageways for passage therethrough of tools operated by said ram, said conical plates serving as a receptacle for filings or chips removed from the works by the tools.

20. A machine of the class described comprising a pedestal, vertical guideways on the rear side of said pedestal, a ram mounted in said guideways for vertical reciprocation and adapted at its upper end for supporting various tools, a work supporting table structure mounted on top of said pedestal below the upper end of said ram, a driving train for said ram for effecting vertical reciprocation thereof for application of tools to work supported on said table, a power source for said driving train, and worm and worm wheel gearing within said pedestal included in said driving train, said gearing being self locking whereby to lock said ram in said vertical position when said driving train is idle.

21. A machine of the class described comprising a pedestal having vertical guideways on its rear side, a ram mounted on said guideways for vertical reciprocation and adapted at its upper end to support various adapters for receiving working tools, a work supporting table mounted on top of said pedestal for supporting work engaged by the tools, a driving power source, a transmission train between said driving source and said ram operable to effect vertical reciprocation of the ram, manual means for operating said transmission train independently of operation of said driving source whereby said ram may be adjusted to any vertical position, said transmission train including self-locking worm and worm wheel gears whereby said ram after manual setting thereof will be locked in set position.

FRANK W. HACK.